(12) United States Patent
Zarei et al.

(10) Patent No.: US 9,165,125 B2
(45) Date of Patent: Oct. 20, 2015

(54) DISTRIBUTION OF DYNAMIC STRUCTURED CONTENT

(75) Inventors: Mehrdad (John) Zarei, Toronto (CA); Jonathan Hamilton, Toronto (CA)

(73) Assignee: MOBILEXTENSION INC., Toronto, Ontario (CA)

( * ) Notice: Subject to any disclaimer, the term of this patent is extended or adjusted under 35 U.S.C. 154(b) by 295 days.

(21) Appl. No.: 13/495,751

(22) Filed: Jun. 13, 2012

(65) Prior Publication Data

US 2013/0340043 A1    Dec. 19, 2013

(51) Int. Cl.
*G06F 21/00* (2013.01)
*G06F 21/31* (2013.01)
*H04L 29/06* (2006.01)
*G06F 21/62* (2013.01)
*G06F 21/60* (2013.01)
*G06Q 10/10* (2012.01)

(52) U.S. Cl.
CPC ............. *G06F 21/31* (2013.01); *G06F 21/00* (2013.01); *G06F 21/60* (2013.01); *G06F 21/6218* (2013.01); *G06Q 10/101* (2013.01); *H04L 63/08* (2013.01); *H04L 63/10* (2013.01)

(58) Field of Classification Search
CPC ......... G06F 21/00; G06F 21/31; G06F 21/60; G06F 21/6218; G06Q 10/101; H04L 63/08; H04L 63/10
USPC ............ 726/2, 3, 4, 5, 9, 26, 27, 28; 709/217; 713/165
See application file for complete search history.

(56) References Cited

U.S. PATENT DOCUMENTS

| | | | |
|---|---|---|---|
| 5,751,949 A * | 5/1998 | Thomson et al. | 726/4 |
| 6,236,987 B1 * | 5/2001 | Horowitz et al. | 1/1 |
| 6,671,853 B1 * | 12/2003 | Burkett et al. | 715/235 |
| 7,240,067 B2 * | 7/2007 | Timmons | 1/1 |
| 2002/0129235 A1 * | 9/2002 | Okamoto et al. | 713/150 |
| 2005/0132272 A1 * | 6/2005 | Bodin et al. | 715/513 |
| 2006/0050686 A1 * | 3/2006 | Velez-Rivera et al. | 370/352 |
| 2007/0016613 A1 * | 1/2007 | Foresti et al. | 707/104.1 |
| 2008/0294490 A1 * | 11/2008 | Nuhaan et al. | 705/9 |
| 2009/0055915 A1 * | 2/2009 | Piliouras | 726/8 |
| 2009/0210441 A1 * | 8/2009 | Mercer et al. | 707/102 |
| 2009/0319291 A1 * | 12/2009 | Noordvyk et al. | 705/2 |
| 2010/0306228 A1 * | 12/2010 | Carpenter et al. | 707/765 |
| 2011/0078595 A1 * | 3/2011 | Johnston et al. | 715/764 |
| 2012/0324507 A1 * | 12/2012 | Weber | 725/37 |
| 2013/0143513 A1 * | 6/2013 | Ginter et al. | 455/404.1 |
| 2013/0185747 A1 * | 7/2013 | Candelore et al. | 725/28 |
| 2013/0198829 A1 * | 8/2013 | Bund et al. | 726/11 |
| 2014/0012750 A1 * | 1/2014 | Kuhn et al. | 705/41 |

* cited by examiner

Primary Examiner — Sarah Su
(74) Attorney, Agent, or Firm — Rowand LLP

(57) ABSTRACT

Described is a method of distributing dynamic structured content from a server or a first communication device to another communication device, the method comprising: populating content fields with data elements to define the dynamic structured content; receiving an identification of an authorized subscriber; associating the authorized subscriber with the dynamic structured content; and, transmitting the dynamic structured content to a communication device associated with the authorized subscriber.

8 Claims, 16 Drawing Sheets

FIG. 8

DISTRIBUTION OF DYNAMIC STRUCTURED CONTENT

FIELD

The present matter relates to communication devices and in particular to methods and systems for the distribution of dynamic structured content.

BACKGROUND

Communication devices are commonly used to transmit data across communication networks and within enterprises. In many cases it would benefit an individual or an organization if a selected number of recipients were to have access to such data. Often the data can be such that it is regularly changing (i.e. it is dynamic). Accordingly, it would be beneficial if the individual or organization could reliably and routinely notify the selected recipients that the data has been updated or changed.

SUMMARY

Disclosed is a method of distributing dynamic structured content from a server to a communication device, the method comprising: populating content fields with data elements to define the dynamic structured content; receiving an identification of an authorized subscriber at the server; associating the authorized subscriber with the dynamic structured content; and, transmitting the dynamic structured content to a communication device associated with the authorized subscriber.

According to another aspect, disclosed is a method of accessing dynamic structured content on a communication device, the communication device associated with an authorized subscriber, the dynamic structured content managed by an administrator, the method comprising: receiving from the administrator a prompt to receive dynamic structured content; in response to receiving the prompt, transmitting to the administrator a request to receive dynamic structured content on the communication device; and, receiving from the administrator the dynamic structured content at the communication device.

According to another aspect, disclosed is a server for distributing dynamic structured content to a communication device, the communication device comprising: a memory; and, computer readable instructions stored on memory and executable by a processor to: populate content fields with data elements to define the dynamic structured content; receive an identification of an authorized subscriber at the server; associate the authorized subscriber with the dynamic structured content; and, transmit the dynamic structured content to a communication device associated with the authorized subscriber.

According to another aspect, disclosed is a computer readable storage medium comprising computer-executable instructions which, when executed, cause a processor to: populate content fields with data elements to define the dynamic structured content; receive an identification of an authorized subscriber at the processor; associate the authorized subscriber with the dynamic structured content; and, transmit the dynamic structured content to a communication device associated with the authorized subscriber.

BRIEF DESCRIPTION OF DRAWINGS

In order that the subject matter may be readily understood, embodiments are illustrated by way of examples in the accompanying drawings, in which:

FIGS. 5 to 11 are screenshots of a user interface displaying a list management application;

For convenience, like numerals in the description refer to like structures in the drawings.

DETAILED DESCRIPTION

Described are systems and methods for distributing dynamic structured content from a server to communication devices operated or accessed by selected authorized subscribers. The dynamic structured content can be a list of information that can be modified by a list administrator. The content fields are populated with data elements to define the dynamic structured content or list. This list can be stored at a database accessible by the administrator, for example. The identification of an authorized subscriber is then received at the server and can be stored in the database in association with the list (e.g. with an indication that the authorized subscriber is authorized to access the list). For example the authorized subscriber can be associated with the dynamic structured content (e.g. in the database). The dynamic structured content is then transmitted to a communication device associated with the authorized subscriber. For example, after the authorized subscriber logs onto a communication device, the communication device may request list updates from the server. In response the server can transmit the list and any updates to the list to be displayed on the communication devices.

Exemplary Network Infrastructure

Figure 1:
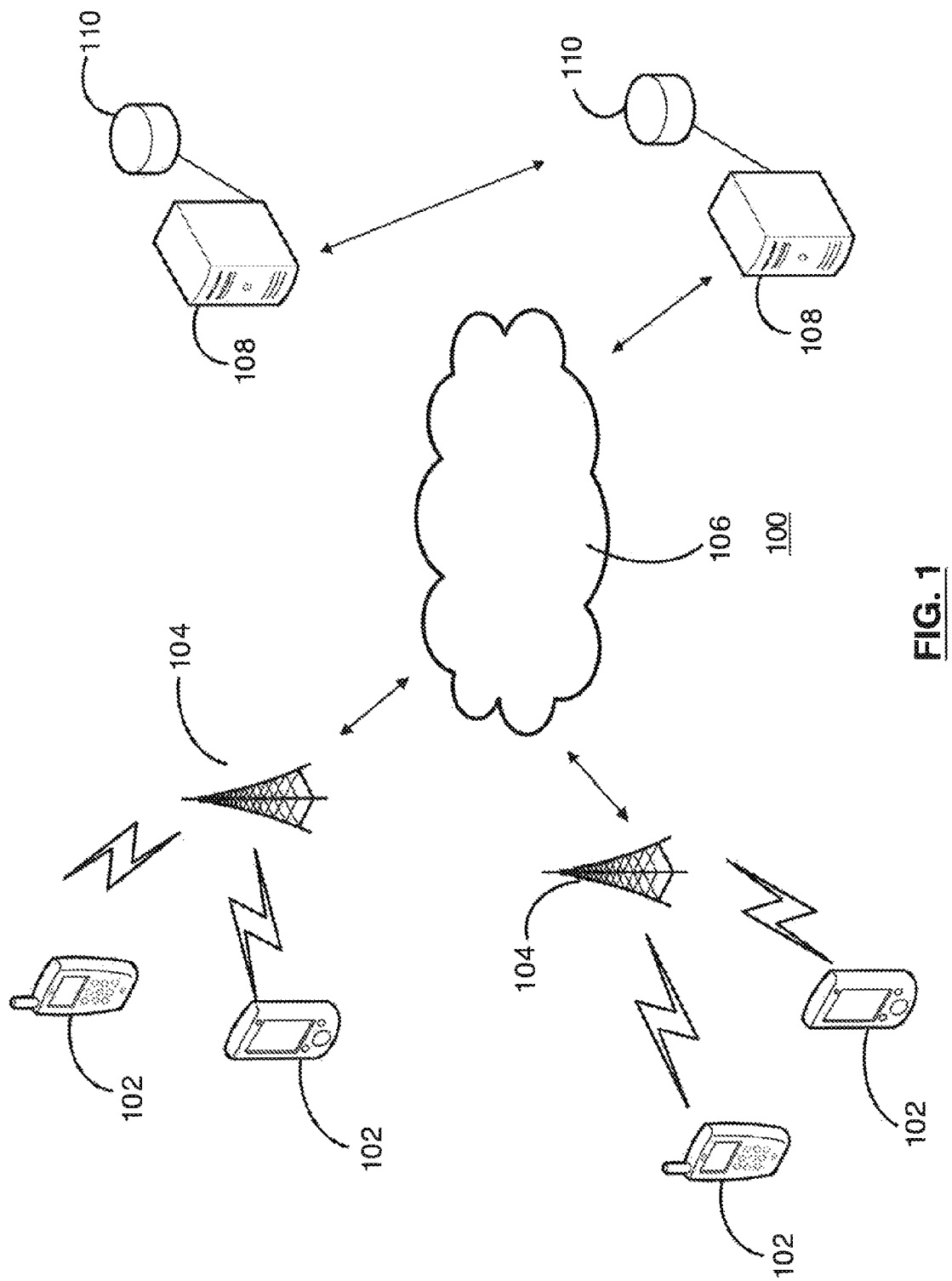
FIG. 1 is a network diagram illustrating a communication network.

Referring to FIG. 1, an exemplary telecommunication infrastructure is illustrated generally by numeral 100. The telecommunication infrastructure 100 includes a plurality of communication devices 102, a plurality of base stations 104, a communication network 106 and a plurality of network servers 108 coupled to databases 110.

The communication devices 102 include wireless computing devices such as smart phones, personal digital assistants (PDA), tablet computers, or personal or desktop computers, for example. The communication devices 102 are in communication with one of the base stations 104. The base stations relay data between the communication devices 102 and the network servers 108 via the communication network 106. The communication network 106 may include several components such as a wireless network, a relay, a corporate server and/or a mobile data server for relaying data between the base stations 104 and the network servers 108.

The network servers 108 include servers such as a web server, an application server 108, and an application server with web services. The network servers 108 may be in communication with the databases 110 in order to store and/or retrieve stored information or data. It is understood that the telecommunication infrastructure 100 described herein is exemplary and that changes may be made to one or more components to accommodate different network configurations without affecting the scope of the aspects described herein.

Each communication device 102 includes a processor. Operating system software used by the processor may be stored in a persistent store such as flash memory, which may alternatively be a read-only memory (ROM) or similar storage element. The operating system, specific device applications, or parts thereof, may be temporarily loaded into a volatile store such as RAM.

The processor, in addition to its operating system functions, enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through the network 106 and installed in RAM, or the persistent store, for execution by the processor.

Accessing Lists

A list is an example of dynamic structured content. Lists generally have columns and rows such that each data field in a column comprises the same type or field of data and such that each data field in the same row is associated together. For example, each row may represent the data for a single entry or individual, and a particular column may represent the names of each individual. In accordance with the present disclosure, lists can be displayed on a user interface of a communication device 102. For example, a list application operating on the communication device 102 can provide a user interface through which lists can be accessed, displayed and/or manipulated. In some embodiments, the list application may be password protected. For example, a user who is authorized as an authorized subscriber (e.g. with an administrator who may manage authorized subscribers for the list application) may be able to access its authorized subscriber by entering a security token (i.e. password) into the list application on a communication device 102. An authorized subscriber may only be authorized (e.g. by an administrator) or "mobilized" to access specific lists. Such authorized lists may be accessible through the list application. Therefore, in the embodiments illustrated herein the list application can be associated with one or more authorized subscribers whereby each authorized subscriber may access its authorized lists using a predetermined security token. For example, after launching the application, a prompt may require the input of authorized subscriber information (e.g. a security token and username) in order to access the lists associated with that authorized subscriber. It is recognized that an administrator may be another user who is provided with authorization to create lists and to authorize other authorized subscribers to access such lists.

Figure 2:
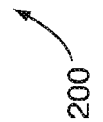
FIG. 2 is a screenshot of a communications device user interface displaying a list.

FIG. 2 is a screenshot of a user interface 200 operating on a list application 201 on a communication device 102 in accordance with an exemplary embodiment. The user interface 200 displays a list 202, list selections 208, a profile button 218, a list button 206, and a search button 214.

The list selections 208 comprise one or more buttons that can be selected to instruct the application 201 to display the selected list 202 on the user interface 200. One or more lists 202 may be associated with icons or logos 240 that are displayed in the list selections 208. In the embodiment shown in FIG. 2, there is only one list 202 displayed in the list selections 208, the "ACME Listing". It is recognized that there may not be any lists in the list selections 208.

Lists 202 generally include content fields. In the embodiment shown in FIG. 2, the content fields have a heading of column identifiers 204 (such as "Full Name, "Phone", and "Email"). The list 202 comprises a series of columns and rows 205. The column identifiers 204 identify the field of data that is shown in the respective column. In accordance with the embodiment shown in FIG. 2, each row of the list 202 defines a list element such that the content in the data field in each column of a single row is associated. For example, "Gregor Samsa" (identified at 210) is associated with "1-800-555-0012" (identified at 211) and with"demoemail@mobilextension.com" (identified at 212). It is understood that while some data fields can be populated with content, other data fields may remain without content. It is understood that lists 202 can include different types of content fields, such as row identifiers or headers or metadata, for example. The content fields define data fields that can be populated with data elements (e.g. 210, 211, 212). The content fields displayed on the user interface (as shown in FIG. 2) may only be a selection of a subset of all of the content fields in the list 202. Data elements and/or content fields and/or lists can be in xml format, csv format or can be embedded data, for example.

The list 202 may be scrollable on the user interface 200 within the application 201. For example, the application 201 may be operating on a touch screen communication device 102 such that scrolling through the list can be accomplished by swiping the user interface 200 with a finger. In one or more embodiments, the list 202 may be scrolled by using another input device, such as a mouse, keyboard or trackball, for example.

The user interface 200 of the application 201 shows a selection of lists 208 identifying one or more lists 202. Each list 202 in the selection of lists 208 can have a different structure. For example, two lists can have different content fields or a different number of column identifiers 204 (e.g. the columns can have different heading titles). The list 202 displayed on the user interface 200 in FIG. 2 is the ACME Listing, identified at the ACME Listing button 220. In FIG. 2, the list button 216 is shown as selected. On selection of the list button 216 the list 202 content is displayed on the user interface 202. The lists 202 shown in the list selections 208 are the lists that are associated with (or accessible by) the authorized subscriber that was used to log onto the list application 201. In other words the lists 202 shown in the list selections 208 are those lists to which the authorized subscriber has been authorized access.

Figure 2A:
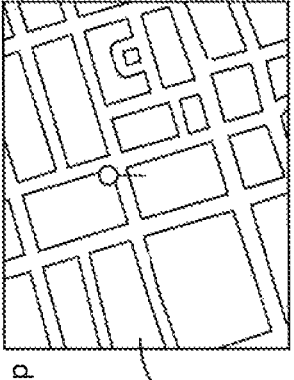
FIG. 2A is a screenshot of a communications device user interface displaying additional details of a list.

Each row in the list 202 may be selectable to reveal additional information such as additional content fields for the row or list item. For example, FIG. 2A shows a details window 250 that provides details of the entry for "Atticus Finch". In other words, the row with "Atticus Finch" was selected (e.g. using a touchscreen, trackball, mouse or other input device or application) and in response the application displayed additional details associated with the "Atticus Finch" entry, such as a title 252, address 254 and a map 256 of the address location. One or more of the details may be selectable in order to launch an application (including a third party application) such as a phone dialing application, an email application or a mapping application. It is understood that one or more of the detail fields may be blank (e.g. the "City" field may not have an entry). It is also understood that there may be more or fewer or different fields showing in the details window 250 depending on the list 202.

Figure 3:
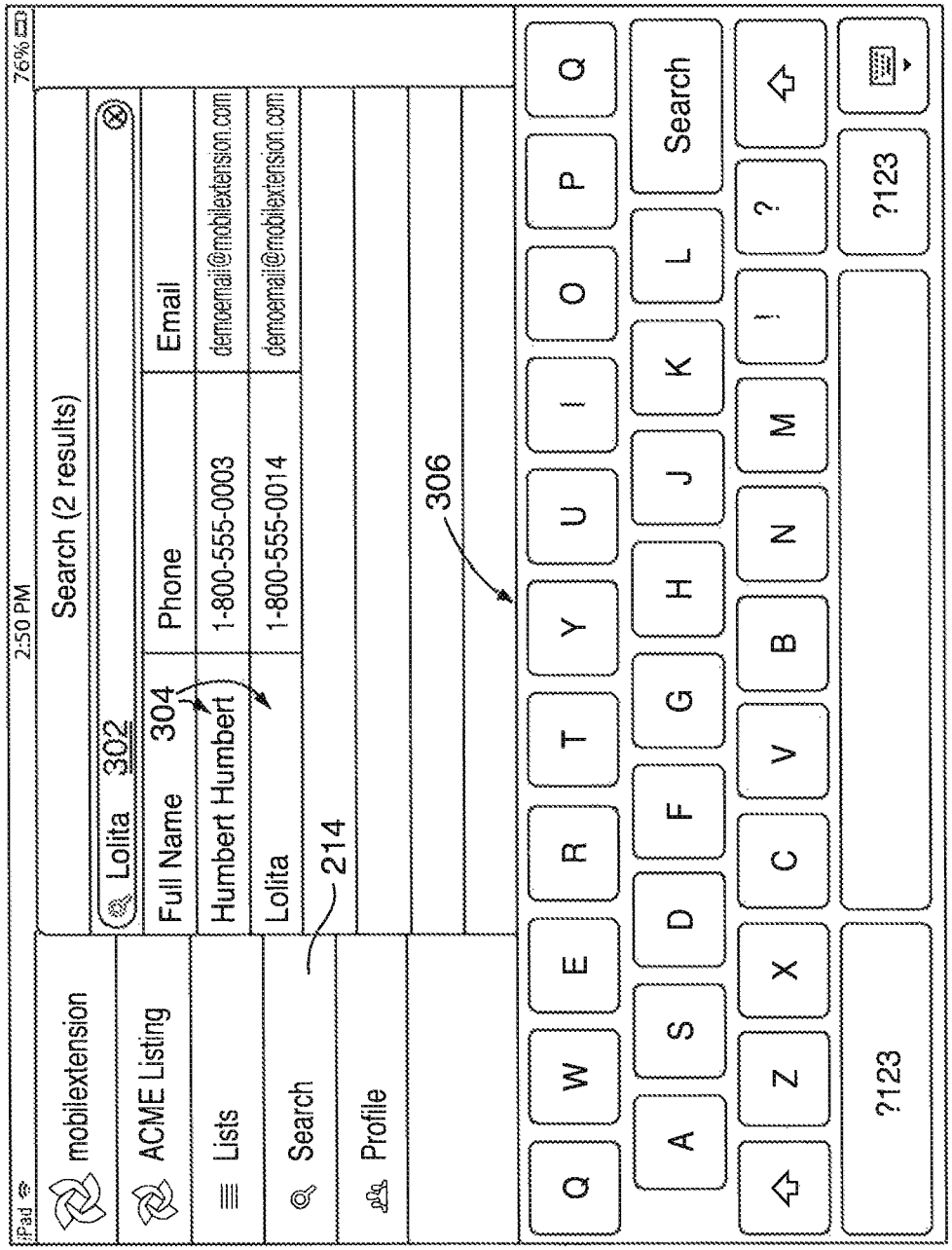
FIG. 3 is a screenshot of a communications device user interface displaying search results.

With reference to FIG. 3, when the search button 214 is selected a search field 302 is displayed on the user interface. In the embodiment shown in FIG. 3, an input device 306 is activated. The input device 306 is shown as a virtual keyboard, however it is recognized that alternative or additional input devices or applications can be used such as a mouse or trackball. A search query can be entered using the input device. As illustrated in FIG. 3, the search query "Lolita" was entered in the search field 302. A search algorithm is then performed on one or more selected lists 202 using the search query. For example, the search algorithm searches the lists 202 associated with the authorized subscriber that is logged onto the list application 201. More specifically, the search algorithm can search all of the details of each list entry (as would be shown in the details window 250) for the search term. As shown in FIG. 3, the search query "Lolita" returned two items, "Lolita" and "Humbert Humbert" (identified at 304).

Figure 4:
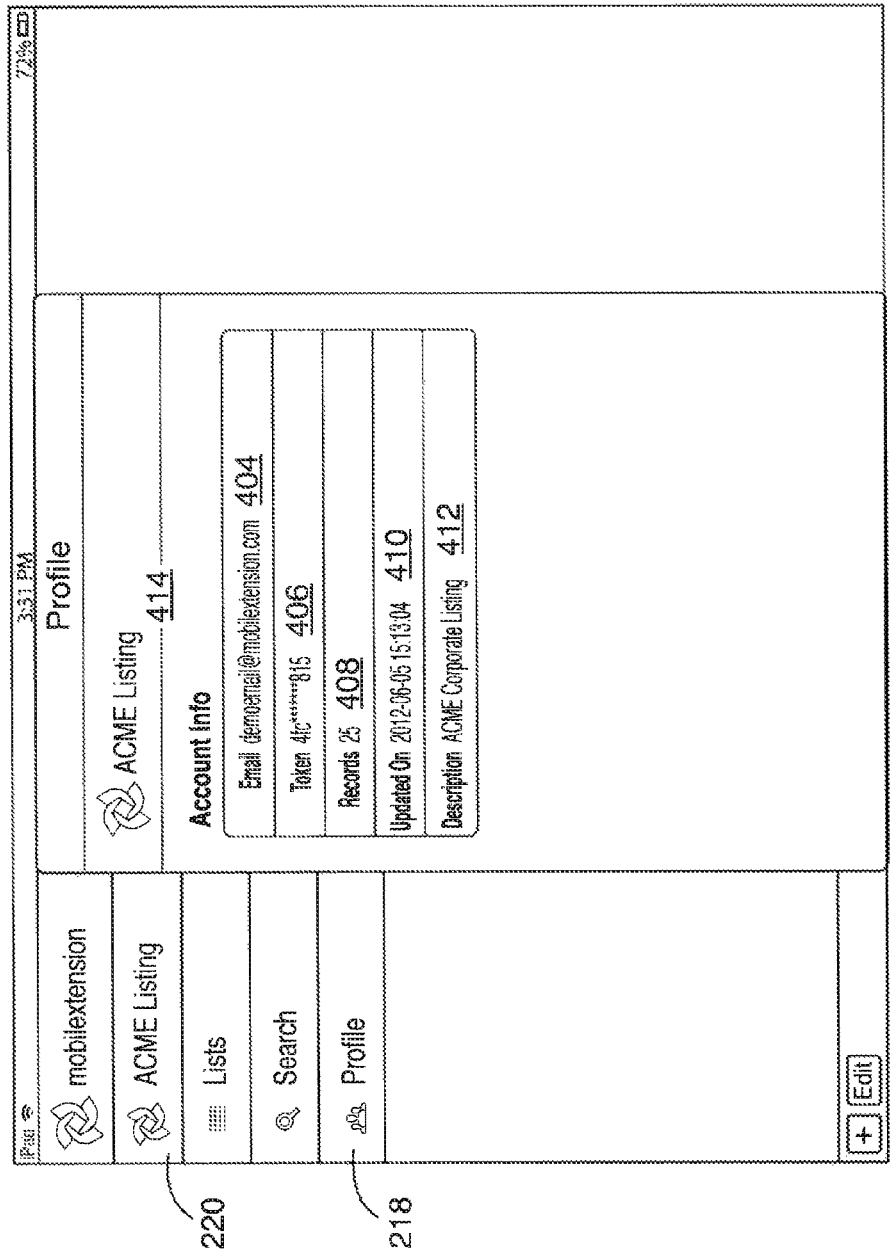
FIG. 4 is a screenshot of a communications device user interface displaying the profile of a list.

With reference to FIG. 4, upon selection of the profile button 218, the profile 414 associated with the selected list (in this case "ACME Listing"220) appears on the user interface 200. A profile 414 can be, for example, information associated with the list 202. In accordance with the illustrated embodiment, the profile 414 includes an email address 404, a token 406, a number of records 408, a last updated field 410 and a description 412. The email address 404 shown in FIG. 4 is the email address for an administrator of the list 202. The administrator can be the person or entity that created the list 202. By way of further example, the administrator may be an authorized subscriber who is authorized to manage the list 202. For example, the administrator may be able to select which subscribers are authorized to access the list and what content populates the list. The security token 406 is a unique number or password that is required in order to access the list 202. The number of records 408 identifies the number of entries (or rows) in the list 202. The last update field 410 identifies the time when the list 202 was last updated with modified content. Finally, the description 412 is a brief text description of the contents of the list 202.

In accordance with an exemplary embodiment, each time a list application 201 is started (or launched) and logged onto by an authorized subscriber, the list application 201 polls a server 108 to access any modifications to existing lists 202 or new lists 202 that the authorized subscriber is subscribed to or is authorized to access. It is recognized that an authorized subscriber may only be required to log on one time after which the authorized subscriber's information may be stored in a cache memory or along with the list application 201 so that the authorized subscriber is automatically logged on when the list application 201 is launched on a particular communication device 102. It is recognized that an authorized subscriber can be a user who is provided with list access information (e.g. a token 406 for a list 202) by an administrator or by another authorized subscriber through email or the list application 201 or another communication method, for example.

List Data

In accordance with an exemplary embodiment, the data elements that populate a list 202 can comprise one or more interactive elements. For example, the data elements can include embedded data or can be connected or coupled to a further application or process. By way of further example, the data elements in a specific field of a list 202 maybe interactive and selectable in order to launch a third party application. The third party application can be a telephone application, a mapping application, an email application, etc. In response to selecting an interactive element, the associated application is launched. In accordance with an embodiment, there may be applications or processes operating on the communication device 102 on which the list application 201 that may be automatically initiated on the selection of a certain type of embedded data (e.g. a phone number or email address). In accordance with an embodiment, the associated applications may be one or more of a phone application, an email application and/or a map application.

In one or more embodiments, a data element in one or more fields of a list 202 can comprise a website link. When the website link is selected, the website may be launched in a browser on the communication device 102.

Administration and Management of Lists

In accordance with an exemplary embodiment, a list 202 can be created on a device 102 and transmitted to selected authorized subscribers such that the lists 202 are then accessible using the list application 201 on communication devices 102 that are logged onto with selected authorized subscribers' logon information. For example, a list 202 can be created using a list management application. The list management application can be accessible through a website that is password protected. By way of further example, access to the website may require entering identifying information along with a password. The term "administrator" is used in this application to identify the entity or person who created a list 202 using the list management application through the website. The administrator may also use the list management application to modify, update, delete or change the content in the list 202 and to add delete or modify authorized subscriber information.

FIGS. 5 to 11 show screenshots of an embodiment of the list management application 500 accessed through a website. It is recognized that the list management application can, in other embodiments, be a stand-alone application that does not operate through a traditional website accessible using a browser. It is understood that the data accessible and managed using the list management application 500 can reside on a database 110, which may be remote from the communication device 102 or computer used to access the list management application 500. For example, the list management application 500 can be accessed through the Internet at a communication device 102 in order to manipulate data that is stored in a database 110. After the list management application 500 is launched an initial prompt may require that a password and/or identification information be entered using an input device. The password and/or identification information may provide access to lists 202 that had been previously created.

Figure 5:
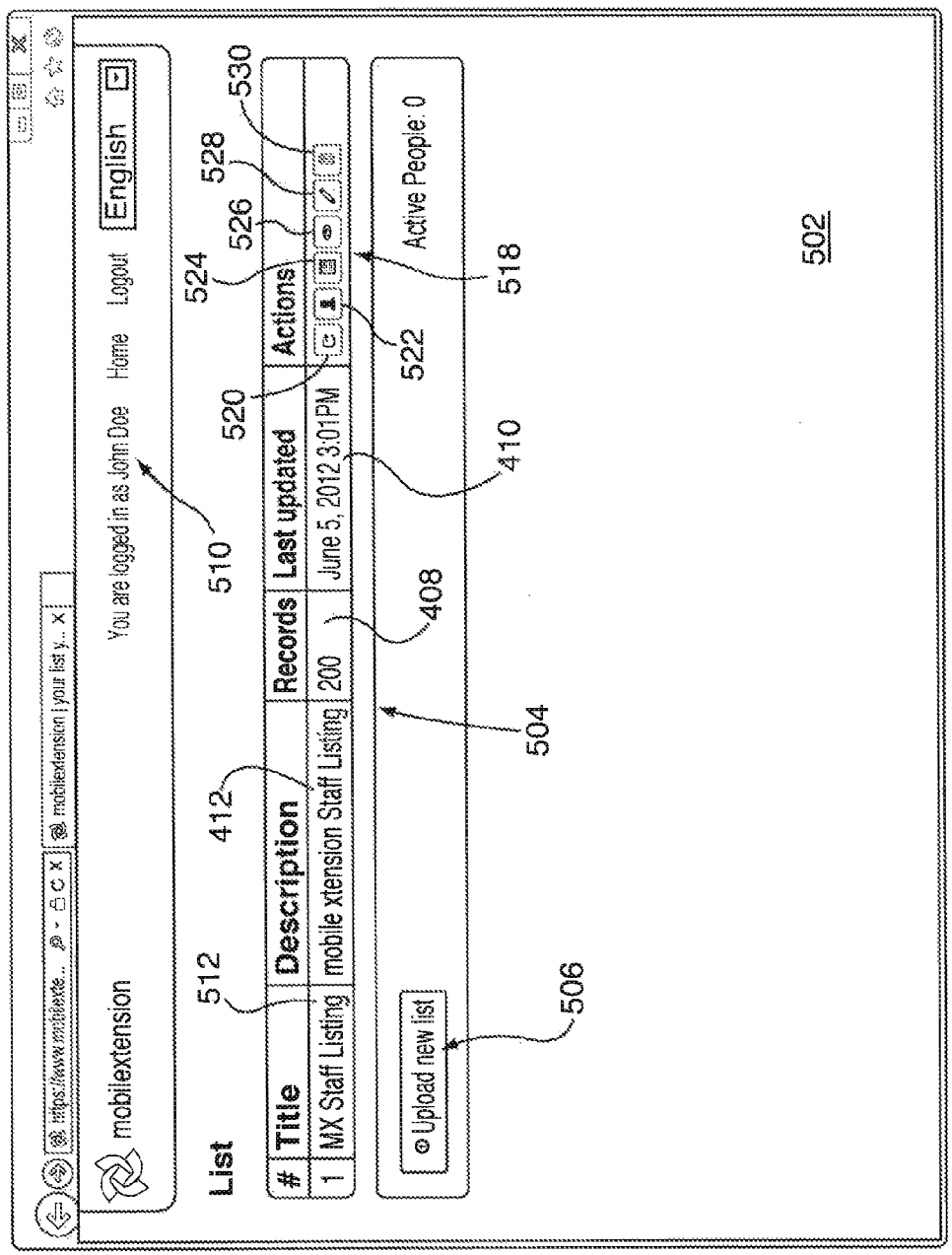

FIG. 5 shows a list display interface 502. The list display interface 502 appears on a display screen of a device 102 when the list management application 500 is launched. The list display interface 502 has a display area 504, a user identification field 510 and a list creation button 506. The display area 504 is for displaying or showing profile information for lists 202 that are managed by an administrator (e.g. the identity of the person who logged onto the list management application 500). In the illustrated embodiment the profile information for one list 202 displayed. In particular, the title 512, description 412, number of records 408 and last updated field 410 are visible. The user identification field 510 displays the identity of the user (e.g. administrator) along with a button for logging out of the list management application 500. In the illustrated embodiment a user identified as "John Doe" is logged onto the list management application 500. The list creation button 506 is shown at the bottom of the display area 504 and may be selected in order to initiate a list creation process. The display area 504 also has an actions field 518, which displays a number of selectable icons including icons that can be identified with the following subheadings: mobilize 520, people 522, layout 524, update 526, data 528 and delete 530. Each of these icons or subheadings can be selected in order to access and/or modify certain information in or associated with the list.

Figure 6:
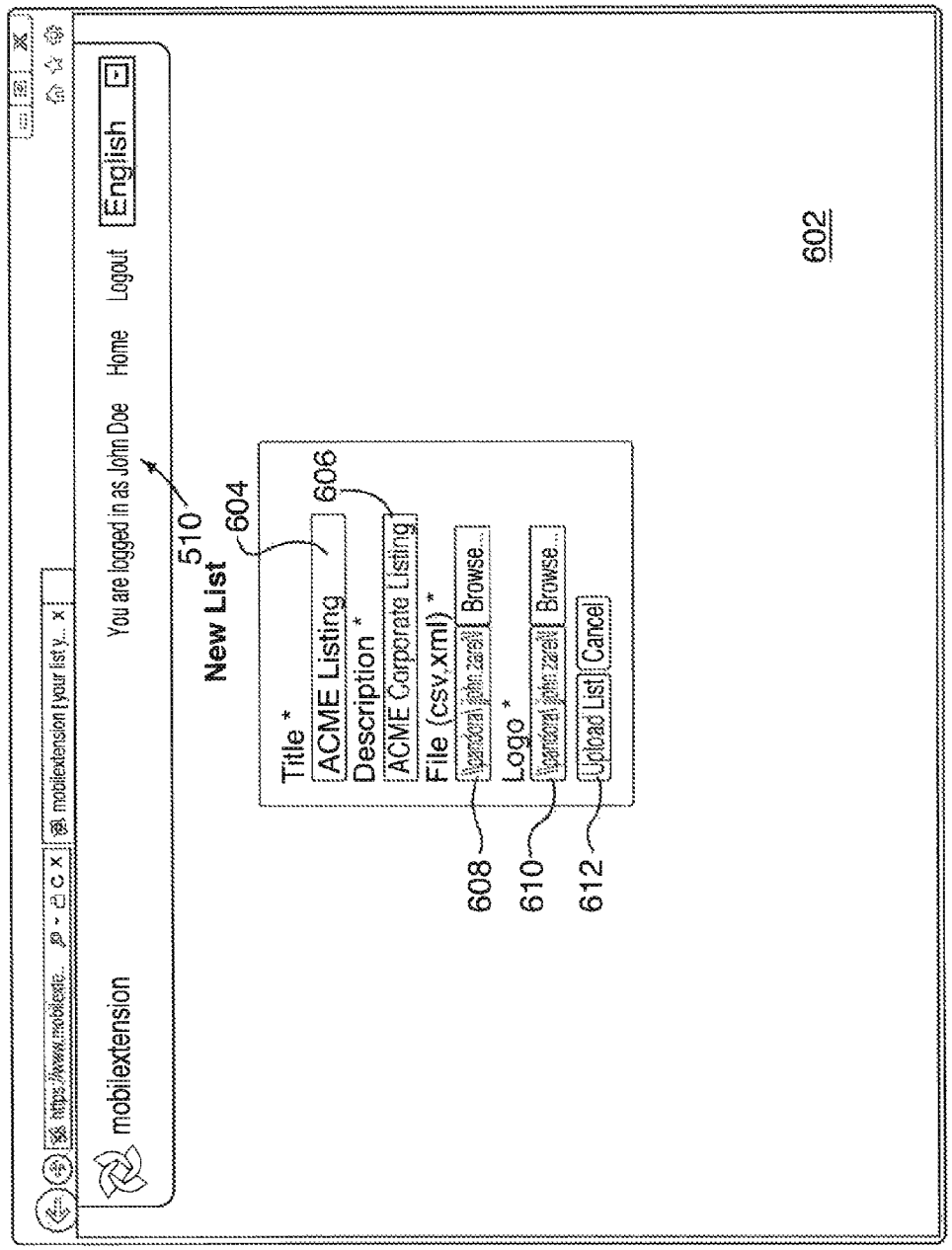

FIG. 6 shows the list creation interface 602 of the list management application 500. The list creation interface 602 can be displayed after the list creation button 506 is selection and is the interface through which the list creation process operates. In other words, a list 202 can be created using this interface 602. The list creation interface has a title field 604, a description field 606, a file upload field 608, a logo upload field 610 and the user identification field 510. Additionally there is an update button 612. Each of the fields 604, 606, 608, 610 (excluding the user identification field 510) allows information to be input so that it can be saved in association with or as a list 202. The input information (and the list 202) can be saved on a database 110 for example. A title of a new list 202 can be input into the title field 604 and a description of the new list 202 can be input into the description field 606. In the illustrated embodiment, the title is input at "ACME Listing" and the description is input as "ACME Corporate Listing". The file upload field 608 and the logo upload field 610 allow content or data and a logo to be uploaded and associated with the list 202. For example, the content or data that is uploaded will populate (or partially populate, or modify) the content fields in the list 202. In accordance with an embodiment, populating content fields with data elements to define the dynamic structured content comprises receiving an uploaded file of structured data that defines the dynamic structured content. In accordance with an embodiment, content can be stored in a file in XML or CSV formats. XML and CSV formats are examples of structured data that can defined the dynamic structured content. It is recognized that other formats for data can be used for populating the content in a list 202 type of structure. The logo can be stored in a .jpg, .tiff, .png or other web browser compatible image file formats, for example. The files containing the content and the logo can be stored in memory on the local device 102 through which the list management application 500 is accessed. When the files are uploaded they can be transferred to a database 110 along with the remaining features or elements associated with the list 202.

In accordance with one or more embodiments, when the upload button 612 is selected, the information and/or files in each of the fields 604, 606, 608,610 is transmitted to a database 110 to be stored for access at a later time. It is recognized that the database 110 can be a remote database 110 that is accessed across a network 106 so that data transferred to the database 110 from a device 102 (e.g. as a consequence of selecting the upload button 612) is transmitted across the network 106.

Figure 7:
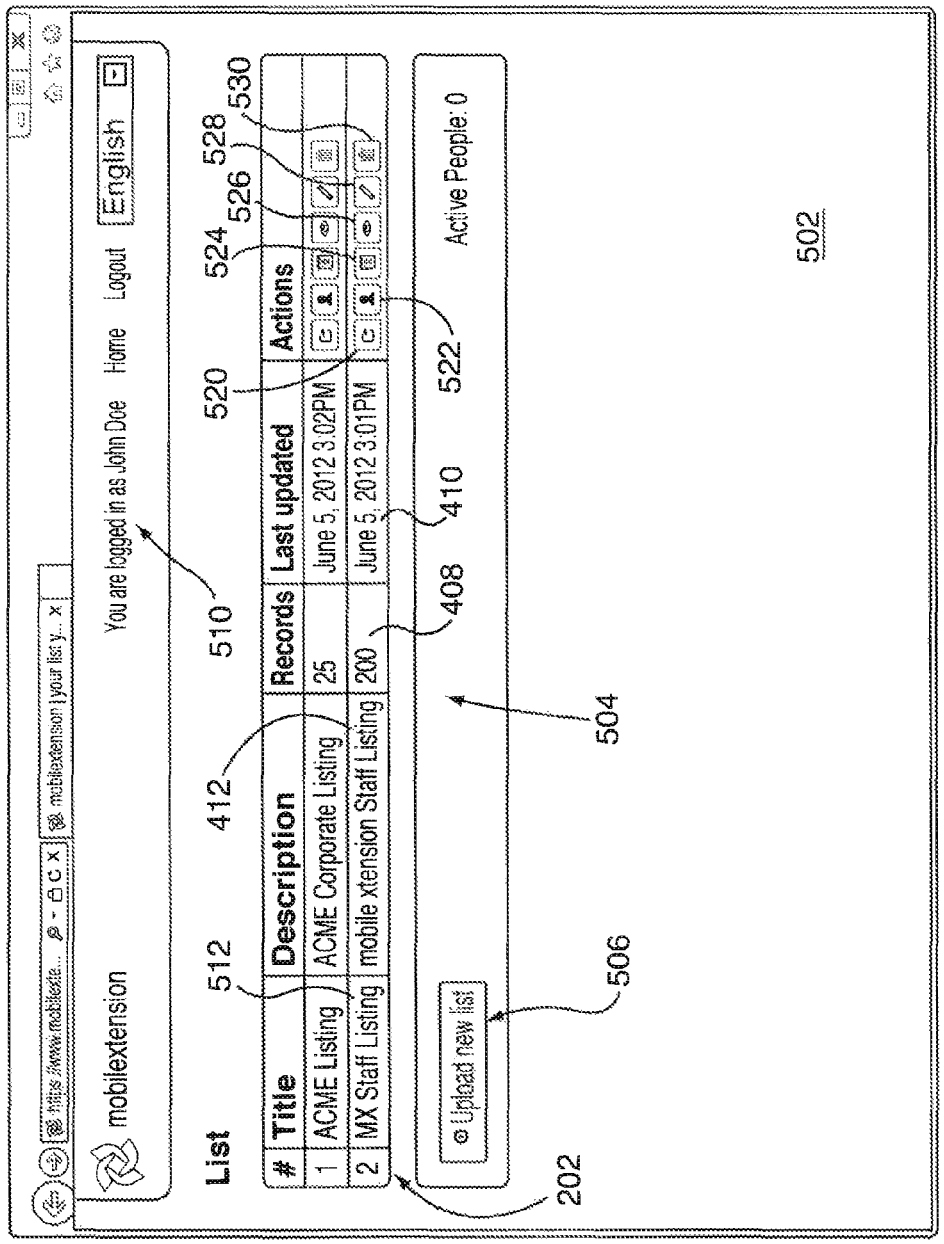
Figure 9:

FIG. 7 shows the list display interface 502 as it appears after the list 202 created through the list creation interface 602 in FIG. 6 is uploaded. The display area 504 now shows the profile information for the uploaded list 202. The profile information includes the title 512, description 412, the number of records 408 in the list and the list update field 410 indicating when the list was last updated.

It is understood that each of the icons or subheadings 520, 522, 524, 526, 528, 530 under the "Actions" heading are coupled to or associated with the list 202 shown in the display area 504. For example, when selecting any of the subheadings 520, 522, 524, 526, 528, 530 certain information or data related to the displayed list 202 in the same row will be displayed on the user interface.

Figure 8:
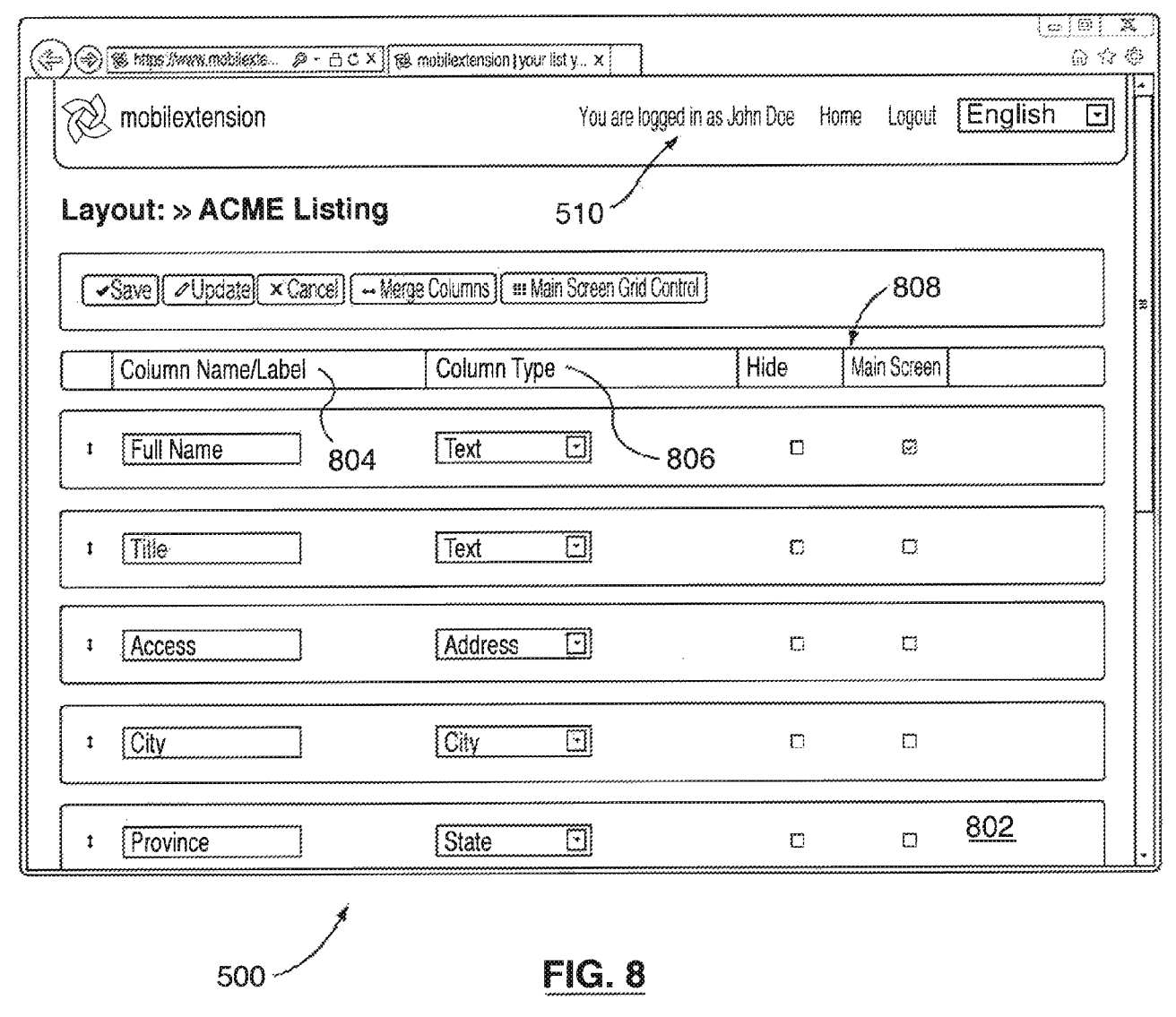

Upon selection of the layout subheading 524 the interface shows a layout display 802as shown in the embodiment illustrated in FIG. 8. The layout display 802 is an interactive interface that allows a user to edit, add, delete and merge column headings in the structured content or list 202. The column name/label heading 804 shows the titles of all of the columns in the list 202. For example, the column in the list 202 refers to the column that appears when the list 202 is displayed on an interface. The title for each column can be edited in the fields provided under the heading 804. The column type heading 806 displays the type of data stored in association with each column in the list 202. In the illustrated embodiment the data types shown include"Text", "Address", "City" and "State". The data type for each identified column in the list 202 can be edited using a pull down menu, for example, in the fields under the column type heading 806. Other data types can include number, image, etc. The hide and main screen headings 808 comprise a Boolean selection identified column in the list 202 that indicates whether the column identified under the column type heading 806 and data will be displayed in the list application 201 when the list application 201 is operated by an authorized subscriber authorized to access the list (e.g. on a communication device 102). If the main screen selection is made, then the identified column and the associated data (i.e. the data in the same row in the layout display 802) will be displayed when the list 202 is loaded or updated to an authorized subscriber and shown on a user interface of the list application 201. Alternatively, if the hide selection is made, the identified column for which the hide selection is made and associated data will not be displayed in the user interface of the list application 201 at the communication device 102. In one or more embodiments, when the hide selection is made, the content field(s) in the identified column(s) selected with "hide" will not be transmitted to the communication device 102 on which the list application 201 logged onto by the authorized subscriber. For example, selecting identified columns using the main screen Boolean selection can amount to selecting a subset of content fields at the server to be included in the list 202 transmitted from the server to the communication device 102 associated with the authorized subscriber or authorized subscriber that is authorized to view the list 202. In accordance with one or more embodiments, when the hide selection is made, the content field(s) in the identified column(s) selected with "hide" will be transmitted to the communication device logged onto by the authorized subscriber(s) but will be displayed on the list application 201 only after the row is selected (i.e. at the communication device 102) to reveal additional information, as described with respect to FIG. 2A above. In such an embodiment, the content fields that had been selected with "hide" comprise the additional information that can be revealed at the communication device 102. update interface 902 as shown in the embodiment illustrated in FIG. 9. The interactive update Upon selection of the update subheading 526, the interface will display the interactive update interface 902 as shown in the embodiment illustrated in FIG. 9. The interactive update interface 902 displays a title field 904, a description field 906, a modification field 908 and a logo field 910. The interactive update interface 902 can be used to modify the data in an existing list 202. The title of the list 202 is displayed in the title field 904 and the description is displayed in the description field 906, either of which can modified by editing the text in the fields 904, 906. Similarly, a new logo file can be entered into the logo field 910 in order to replace the existing logo associated with the list 202. Finally the data can be amended in the list 202 by selecting a data file (e.g. in XML or CSV formats). The data selected can replace, modify or append the existing data populating the list 202 using one of the appropriate bubble selections in the modification field 908 (e.g. the "Modify", "Append" or "Replace" bubbles). After any such changes are made to the list 202 the update button 912 can be selected after which the list 202 will be modified as indicated in any one or more of the fields 904, 906, 908, 910.

Figure 10:
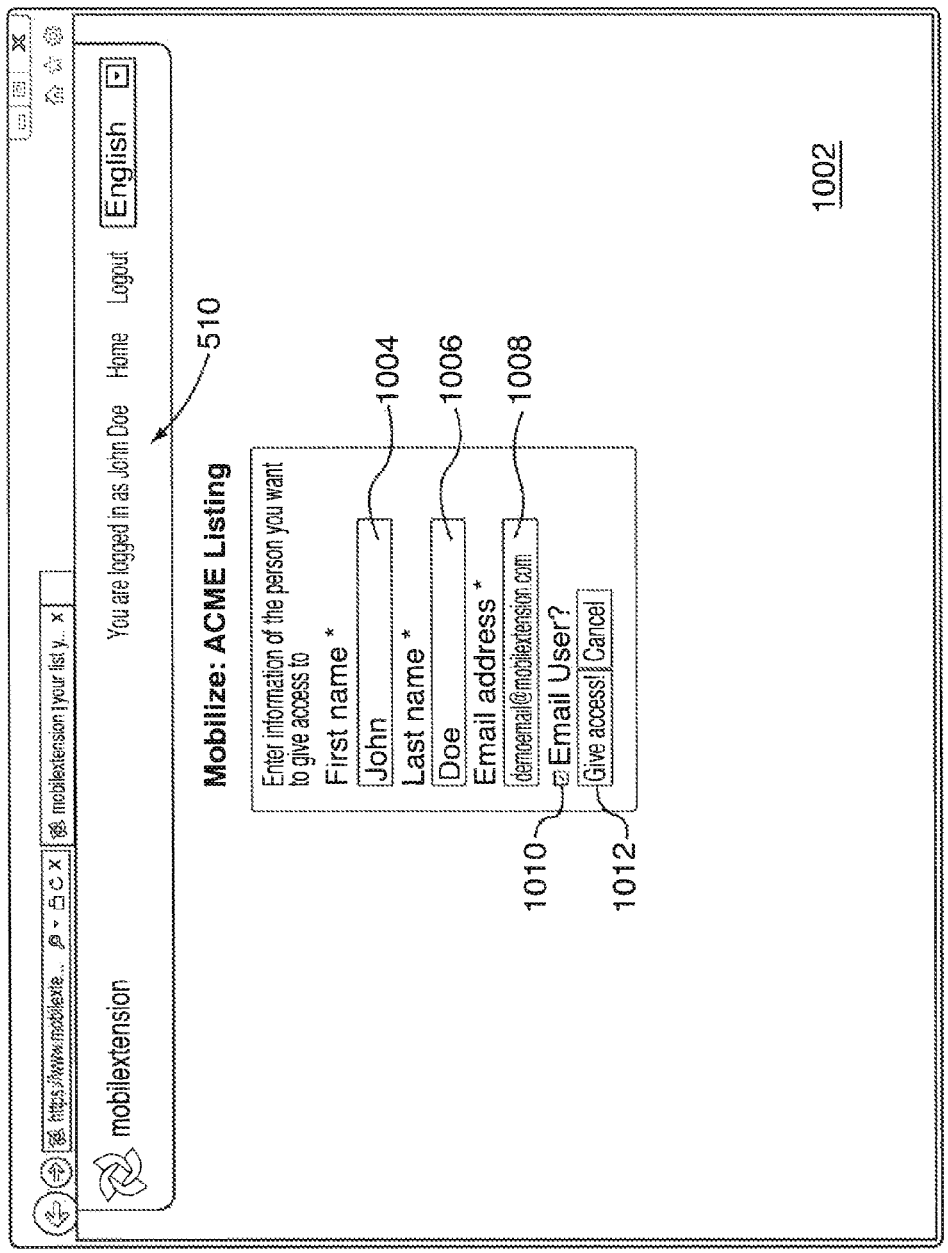

Upon selection of the mobilize subheading 520 the application 500 displays the mobilize interface 1002, an example of which is shown in the embodiment illustrated in FIG. 10. The mobilization interface 1002 is used to select authorized subscribers to which the list 202 will be available. The mobilize interface 1002 includes a first name field 1004 and a last name field 1006 for inputting the first and last name of the intended recipient (i.e. subscriber), respectively, as well as an email address field 1008 for inputting the email address of the intended recipient. A bubble selection 1010 can be included for identifying whether the subscriber or intended recipient uses email. If the bubble 1010 is not selected then another communication means is identified other than the email in the email field 1008. For example, a phone number or physical address of the subscriber or intended recipient will be entered into the email field 1008. Finally, the give access button 1012 can be selected in order to store the input information in memory (e.g. the database 110) in association with the list 202. As a result a number of identified authorized subscribers or intended recipients may be stored in association with the list 202 and may also be identified as having access to the list 202 or being authorized to access the list 202.

Figure 11:
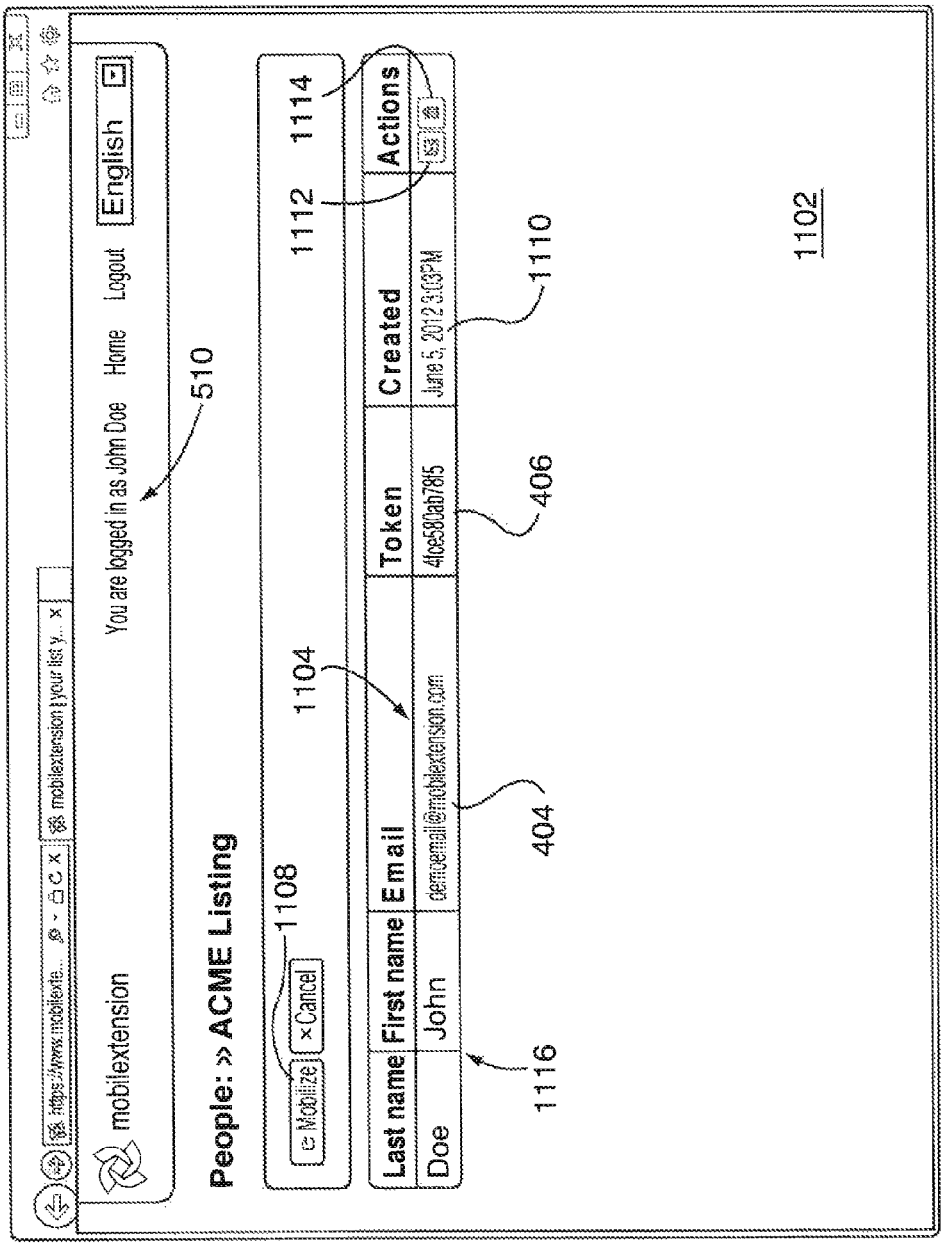

Upon selection of the people subheading 522, the people interface 1102 is displayed, an example of which is shown in FIG. 11. The people interface 1102 provides a list of all of the authorized subscribers or intended recipients who have been provided access to the list 202 through the mobilization interface 1002. The interface 1102 displays information for a list of subscribers (i.e. intended recipients) 1104 (in this case only one, John Doe) and a mobilize button 1108. The information for the list of subscribers 1104 includes each subscriber's name 1116, email address 404, security token 406, creation date 1110 and may also include one or more actions shown as the icons representing send email 1112 and delete 1114. The creation date 1110 field displays the date when the subscriber 1104 information was created and/or added as an authorized subscriber.

In accordance with an embodiment, when the mobilize button 1108 is selected, a request is transmitted to the subscribers (i.e. intended recipients) listed 1104 via the provided email address (or other communication means as the case may be) to access the list 202 (i.e. the subscriber is "mobilized" with respect to the list 202). The email request can also include the security token 406. The security token 406 represents a security feature and may be a password that is required to be input in order to access the list 202 through the list application on a communication device 102 in association with the subscriber which received the token 406. When the delete 1114 button is selected the subscriber information is deleted and, if applicable, the subscriber 1104 may be removed as an authorized subscriber (e.g. the database may be updated so that the subscriber 1104 is no longer identified as an authorized subscriber). When the email action 1112 button is selected the security token 406 can be emailed to the identified email address 404. Further, according to an embodiment, selecting the mobilize 1108 button stores the subscriber's information in memory (or in a database) in association with an indication that the subscriber is authorized to access identified list.

The data 528 and delete 530 subheadings similarly lead to interactive user interfaces where the data elements can be modified and deleted, respectively, or where authority for selected subscribers can be removed from accessing selected lists 202. When the authority for a selected subscriber is removed from accessing selected lists that subscriber will no longer have access to the selected lists.

Figure 12:
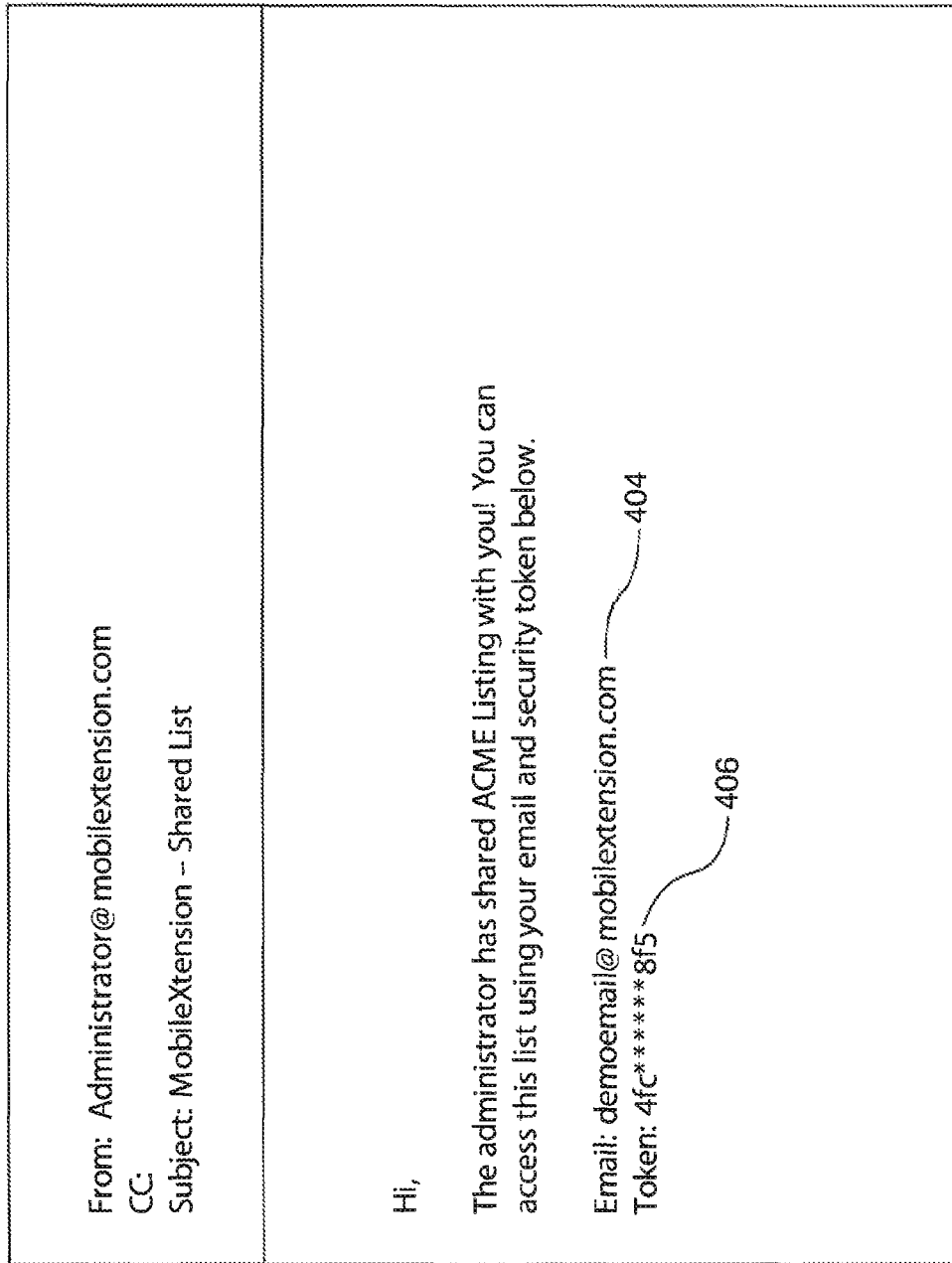
FIG. 12 is a screenshot of a received email.

Referring now to FIG. 12, the email transmitted to the mobilized authorized subscribers is shown generally at 1202. In accordance with the illustrated embodiment, the email includes the email address 404 and token 406 associated with the authorized subscriber by the administrator and which may be stored in the database 110 along with other mobilized authorized subscribers for the list 202.

The email in FIG. 12 displays the email address 404 of the authorized subscriber and the security token 406 for the authorized subscriber. The email address 404 and security token 406 can be used to add a list 202 (the ACME Listing in the embodiment shown in FIG. 12) to the authorized subscriber through the list application 201. In other words, using the security token 406 and email address 404, the authorized subscriber can access the identified list 202 on a communication device 102 using a list application 201.

Figure 13:
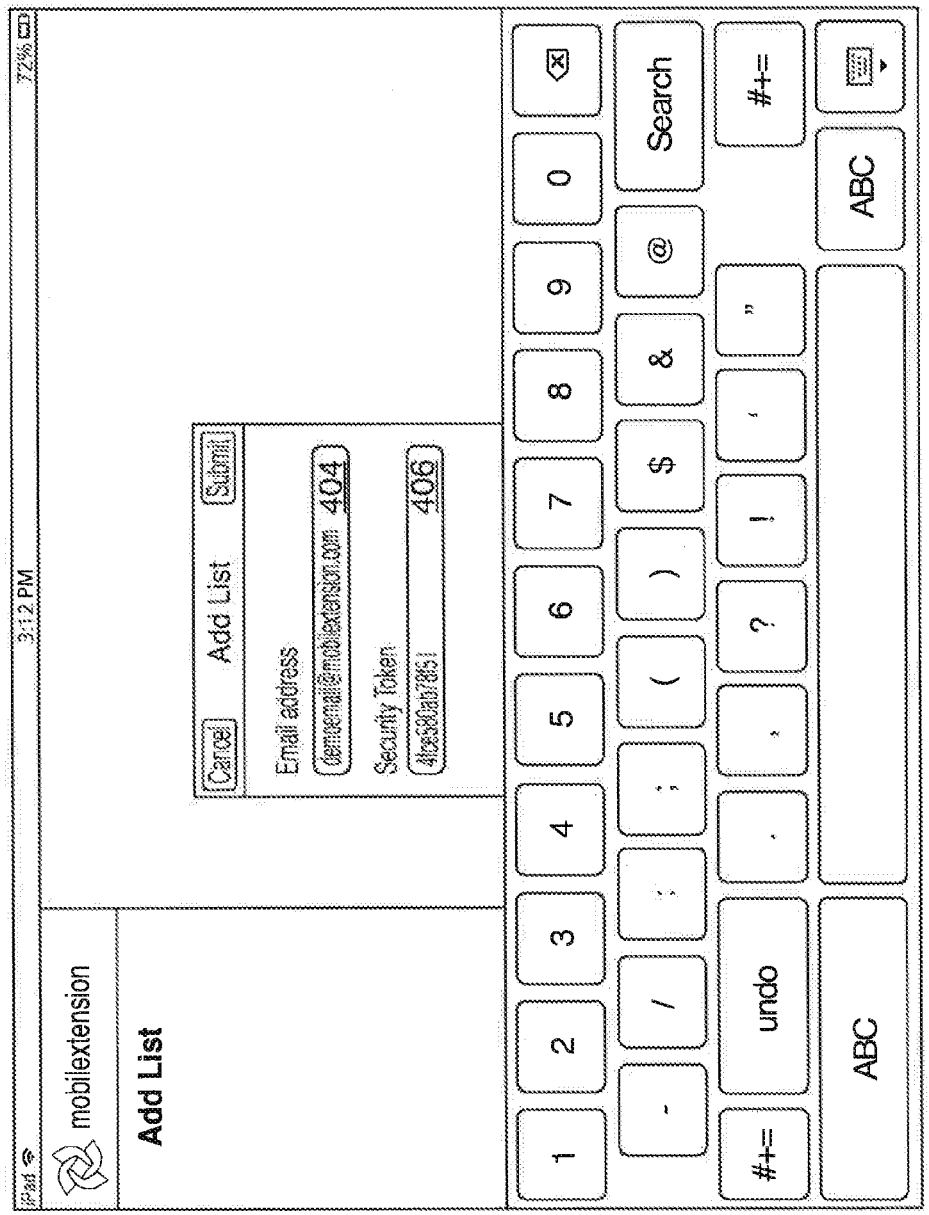
FIG. 13 is a screen shot of a communications device user interface displaying an add list window.

FIG. 13 shows an add list window in the list application 201 interface 200 at the communication device 102 after an authorized subscriber (or someone using the authorized subscriber's credentials) has logged onto the list application 201. In the add list window there is a field for entering and email address 404 and a field for entering a security token 406. The email address and security token received from the email transmission (shown in FIG. 12) can be input in order to provide access to the list 202. After the email and security token are input they are verified (and may be transmitted to remote server and/or database for this verification process) and the list 202 is then uploaded to the list application 201 for viewing. For example, the list may be transmitted by a server 108 from a database 110 to the communication device 102 where the list application 201 is operating. Note that the list 202 is associated with the authorized subscriber and can only be viewed with the list application 201 when it is logged into with the authorized subscriber or with another authorized subscriber that has been mobilized and/or verified to access the list 202.

In accordance with an exemplary embodiment, information or data related to each authorized subscriber is stored remotely in a database 110 that is accessible by the administrator. The database 110 stores an indication of all of the lists 202 that the authorized subscriber has access to or is authorized to view. For example, the identification of a list 202 (or other related information) may be added to the database 110 in association with an authorized subscriber in response to the authorized subscriber being mobilized to access the list at the mobilization interface 1002.

Exemplary Method of Distributing Dynamic Structured Content

Figure 14:
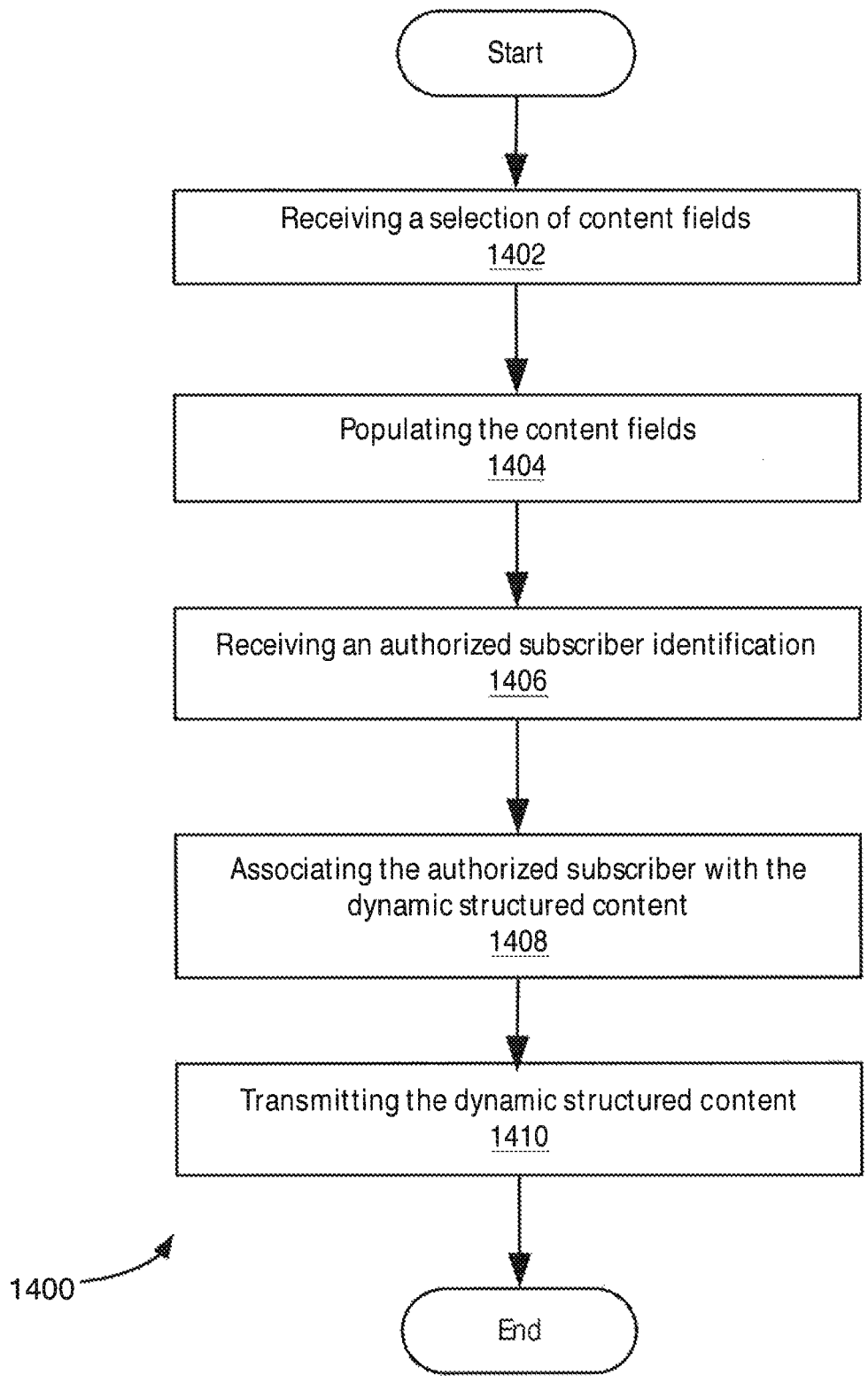
FIG. 14 is a flow chart illustrating a method of distributing dynamic structured content to a communication device; and, FIG. 15 is a flow chart illustrating a method of accessing dynamic structured content on a communication device.

With reference to FIG. 14, an exemplary method of distributing dynamic structured content from a server 108 to a communication device 102 is illustrated generally at number 1400. It is understood that a list 202 is an example of dynamic structured content. Further, the server 108 can also be another communication device 102. In other words, the communication device 102 can be distributing the dynamic structured content.

At 1402, a selection of content fields is received. In accordance with an embodiment, the selection of content fields can be made by an administrator using the layout interface 802. It is understood that an administrator identifies a person or entity that accesses the list management interface 500, which may be password protected. The content fields can be the column names 804 and column types 806 listed in the layout interface 802. As noted above, these column names 804 and types 806 can be selected (e.g. added, deleted, merged, etc.) in accordance with the layout interface 802. It is understood that the layout interface 802 may include additional software applications or methods for selecting content fields for the list 202 or dynamic structured content. It is further understood that the selection of content fields may be performed by uploading data for a list 202 using the upload field 608. For example, when data is uploaded it may automatically select the content fields (i.e. the content fields will be specified in the uploaded data).

At 1404, the content fields are populated with data elements 210 to define the dynamic structured content. In accordance with one or more embodiments, populating the content fields can be performed using the list creation interface 602. As described above, the data for the list 202 can be uploaded using the file upload field 608. A file can be saved locally by the administrator (for example, in XML or CSV format or another type of structured format) and can be uploaded by the administrator to the list 202 in order to populate the list with data (i.e. to populate the content fields of the list 202 with data). In other embodiments, an application can be launched from the list management application 500 which provides an interface for directly entering data into the content fields of a selected list 202. It is recognized that the term "content fields" refers to the any of the data entries in the list 202. In accordance with an embodiment, populating the content fields with data elements comprises populating the content fields with one or more of email addresses, phone numbers, addresses and website links. In a further embodiment, populating the content fields with data elements comprises populating the content fields with embedded data.

At 1406, the identification of an authorized subscriber is received. In accordance with an embodiment discussed above, an authorized subscriber (or a person who has logged on to the application interface) can enter a token 406 and an email address to signify that it is mobilized to receive the list 202. After this information is entered it is transmitted (e.g. by the application running on the communication device 102 operated by the authorized subscriber) to a server 108 or another device 102 operated by the administrator. The token 406 and email address 404 are then verified and the list 202 is transmitted to the authorized subscriber so that it is accessible from the application interface accessed by the authorized subscriber (e.g. by logging on). It is understood that the authorized subscriber may first be selected by the administrator and then a token and email address are emailed or otherwise transmitted to the authorized subscriber. The authorized subscriber may then be able to enter the token and email address into the application interface (i.e. at the add list window) to trigger the transmission of the token and email address back to the administrator.

At 1408, the authorized subscriber is associated with the dynamic structured content. For example, the authorized subscriber information (e.g. the authorized subscriber name and other identifying information) may be stored in a database 110 accessible by the administrator (e.g. with a password). The authorized subscriber information may be stored in the database 110 along with an indication that the authorized subscriber is mobilized or authorized to access a particular list 202. It is understood that this database 110 information may only be accessible by an administrator or by another entity with pre-determined privileges.

At 1410, the dynamic structured content is transmitted to a communication device 102 associated with the authorized subscriber. For example, after the token 406 and email address 404 entered at the application interface are verified, the list 202 may be transmitted to the application on the communication device 102 such that it is accessible by the authorized subscriber. The list 202 then appears in the application interface that was logged onto by the authorized subscriber.

In accordance with one or more embodiments, the data elements that populate the content fields can be modified (or amended, deleted or added to) thereby modifying the dynamic structured content. This can be performed at the modification interface, as described above. The modified dynamic structured content can then be transmitted to the communication device 102 associated with the authorized subscriber. For example, each time an authorized subscriber associated with a list 202 launches and logs onto the application interface (e.g. on a communication device 102) the communication device 102 can automatically poll the administrator (or the server 108 and/or database 110) to access any modified data for the list 202. If the data for the list 202 has been modified, the modified file, which may have been stored at the database 110, will be transmitted to the application running on the device 102. The list 202 will then be displayed with the modified data on the application interface running on the device 102 that has been logged onto with an authorized subscriber's information.

In accordance with one or more embodiments, the identification of a second authorized subscriber can be received at the administrator's device, which can be a server for example. As described above, this can happen after the second authorized subscriber has been added to the authorized subscribers (or mobilized) by an administrator using the mobilization interface 1002. A security token 406 can then be transmitted to the second authorized subscriber, who can then access the list 202. As noted above, the security token 406 can be required to access the dynamic structured content or list 202. The second authorized subscriber will be associated with the list 202 in the database 110 by the administrator with an indication that the second authorized subscriber is verified or authorized to access the list 202. After the security token 406 is received from the second authorized subscriber (i.e. from a communication device 102 accessed by the authorized subscriber), the administrator may then transmit the list 202 to a communication device associated with the second authorized subscriber. For example, the list 202 can be transmitted to the communication device 102 on which the second authorized subscriber has logged onto the application interface.

Exemplary Method of Accessing Lists

Figure 15:
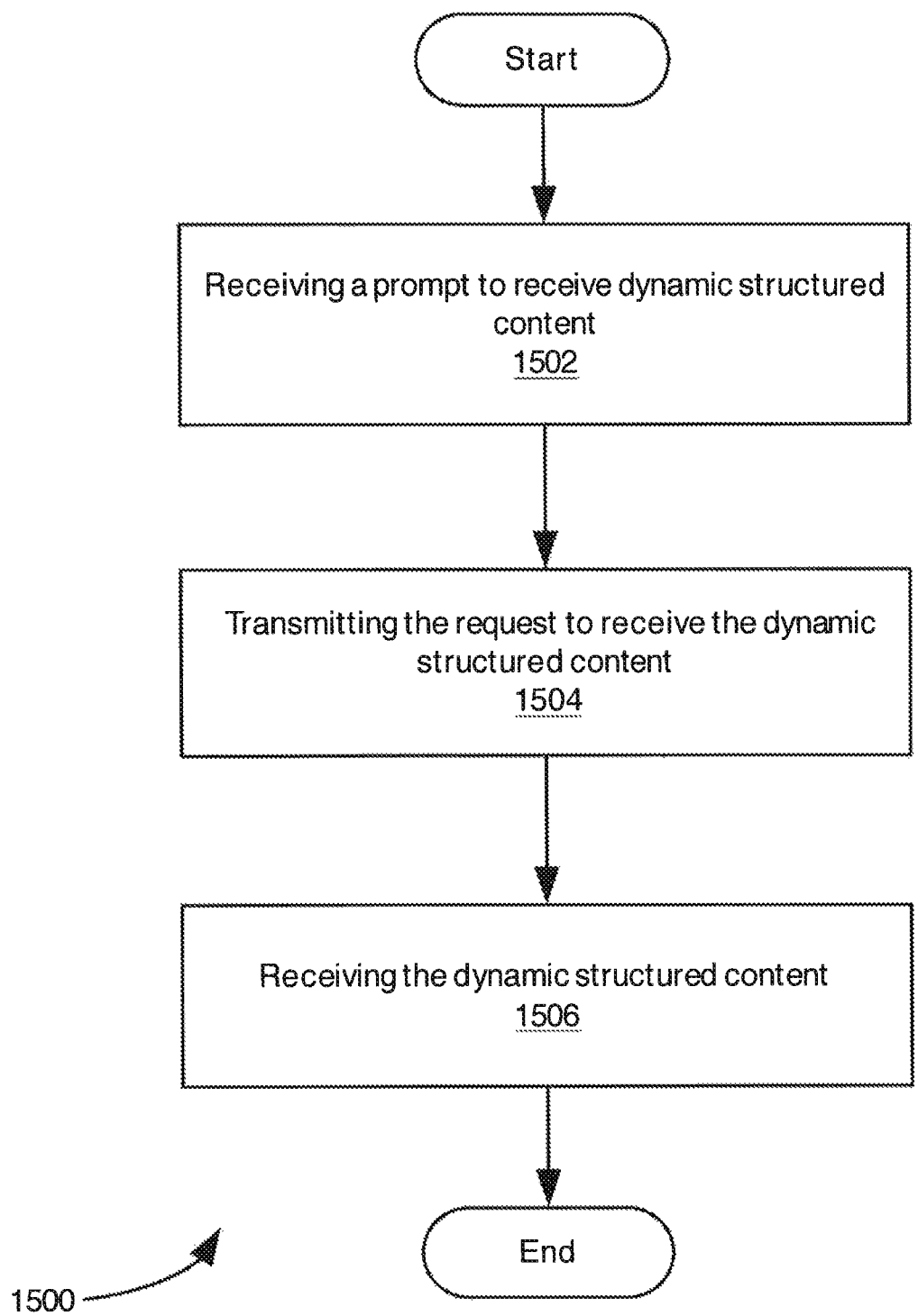

With reference to FIG. 15, an exemplary method of accessing dynamic structured content on a communication device 12 is shown generally at 1500. It is understood that the communication device 102 can be associated with an authorized subscriber. For example, an authorized subscriber can log onto the list application operating on the device 102. It is also understood that the dynamic structured content (e.g. a list 202) is managed by an administrator.

At 1502 a prompt is received from an administrator prompting the receipt of dynamic structured content. For example, the prompt can comprise an email 1202 which can be received by the authorized subscriber at a communication device 102 from the administrator (or the administrator's communication device 102 or server) requesting that the authorized subscriber access a list 202. The email 1202 can include a security token 406.

At 1504, in response to receiving the prompt, a request to receive the dynamic structured content on the communication device 102 can be transmitted back to the administrator. In accordance with one or more embodiments, the security token 406 can be used at the communication device 102 for accessing the list 202. For example, after the security token 406 is entered into the add list window, the token 406 is then transmitted back to the administrator (e.g. on a separate device 102 or server 108) where the token 406 is verified with the database 110 of authorized subscribers.

At 1506, the dynamic structured content is received at the communication device 102 from the administrator. For example, after the security token 406 is verified with the database of authorized subscribers by the administrator, the administrator may transmit the list 202 to the authorized subscriber through the application interface on the communication device 102.

In accordance with an embodiment, the authorized subscriber may also receive from the administrator modifications to the dynamic structure content or list 202. The list 202 may then be modified on the communication device 102. For example, upon logging on to the list application 201 the communication device 102 (on which the list application 201 is running) may transmit a request to the administrator (or server) requesting available updates to any lists 202 associated with the authorized subscriber. If any updates (or modifications) are available for any such lists 202 they can then be transmitted to the authorized subscriber (or the communication device 102 on which the list application 201 is running).

After the dynamic structured content or list 202 (and/or any modifications) are received at the communication device 102, the list 202 may then be displayed on a user interface of the communication device 102 (i.e. through the list application 201).

The transmission of the data from the administrator to the authorized subscriber may cause multiple devices to be synchronized. For example, each interface application that the authorized subscriber logs onto will receive the transmitted lists 202 (including any modified content) each time the application is launched.

In accordance with one or more embodiments, the authorized subscriber can receive from a second administrator (e.g. from a server) a second prompt to receive second dynamic structured content (e.g. a second list 202). In response to receiving the second prompt, the authorized subscriber may transmit to the second administrator a request to receive the second dynamic structure content on the communication device 102 (e.g. on which the authorized subscriber is logged onto the list application 201). The authorized subscriber will then receive from the second administrator the second dynamic structured content at the communication device 102.

After a user has initially input the security token 406 the list application 201 may automatically retrieve the modified data (if available) for any list that the user was previously provided access to.

One or more embodiments have been described by way of example. It will be apparent to persons skilled in the art that a number of variations and modifications can be made without departing from the scope of what is defined in the claims.

What is claimed is the following:

1. A method of distributing a dynamically-updated list from a server to a plurality of mobile communication devices, each of the mobile communication devices being associated with a respective authorized subscriber of the dynamically-updated list, the method comprising:
   receiving a list creation request from an administrator via a list administration application;
   receiving uploaded structured content from the administrator, and storing the structured content in a database as the dynamically-updated list, wherein the list includes at least two columns having two or more rows, the columns and rows defining content fields having data elements therein;
   receiving, from the administrator, a first selection of one or more columns to be made available to authorized subscribers but not displayed on a main page of a list application operating on each of the plurality of communication devices;
   receiving, from the administrator, contact information for each of the authorized subscribers at the server;
   associating each of the authorized subscribers with the dynamically-updated list;
   receiving a request for access to the dynamically-updated list from one of the authorized subscribers;
   transmitting the data elements in the columns to the list application operating on a communication device associated with the one of the authorized subscribers;
   displaying, on the main page of the list application operating on the communication device, the data elements of the columns that are not in the first selection; and
   in response to selection of one of the rows in the main page, displaying data elements of the columns that are in the first selection,
   wherein the main page includes the graphic display of data elements generate by the list application after launch.

2. The method of claim 1, further comprising:
   subsequently modifying one or more of the data elements based on editing by the administrator via the list administration application; and
   in response to the editing, transmitting the modified one or more of the data elements to the communication device associated with the one of the authorized subscribers.

3. The method of claim 1, wherein the dynamically-updated list comprises one or more columns of email addresses, phone numbers, addresses and website links.

4. The method of claim 1, wherein receiving uploaded structured content from the administrator comprises receiving one of XML and CSV formatted data.

5. The method of claim 1 further comprising:
   associating a security token with the one of the authorized subscribers, wherein the security token is required to access the dynamically-updated list;
   wherein receiving a request comprises receiving the security token from the communication device associated with the one of the authorized subscribers,
   and wherein transmitting the data elements to a communication device associated with the one of the authorized subscribers occurs after receiving the security token.

6. A server for distributing a dynamically-updated list to a plurality of mobile communication devices, each of the mobile communication devices being associated with a respective authorized subscriber of the dynamically-updated list, server comprising:
   a memory; and,
   computer readable instructions stored on memory and executable by a processor to:
   receive a list creation request from an administrator via a list administration application,
   receive uploaded structured content from the administrator, and store the structured content in a database as the dynamically-updated list, wherein the list includes at least two columns having two or more rows, the columns and rows defining content fields having data elements therein, receive, from the administrator, a first selection of one or more of the columns to be made available to authorized subscribers but not displayed on a main page of a list application operating on each of the plurality of communication devices, receive, from the administrator, contact information for each of the authorized subscribers at the server;

associate each of the authorized subscribers with the dynamically-updated list, receive a request for access to the dynamically-updated list from one of the authorized subscribers, transmit the data elements in the columns to the list application operating on a communication device associated with the one of the authorized subscribers;

display, on the main page of the list application operating on the communication device, the data elements of the columns that are not in the first selection; and in response to selection of one of the rows in the main page, display data elements of the columns that are in the first selection, wherein the main page includes the graphic display of data elements generate by the list application after launch.

7. The server of claim 6, wherein the processor is further configured to:

subsequently modify one or more of the data elements based on editing by the administrator via the list administration application that populates the content fields thereby modifying the dynamic structured content; and in response to the editing, transmit the modified one or more data elements to the communication device associated with the one of the authorized subscribers.

8. A non-transitory computer readable storage medium comprising computer-executable instructions which, when executed, cause a processor to:

receive a list creation request from an administrator via a list administration application, receive uploaded structured content from the administrator, and store the structured content in a database as the dynamically-updated list, wherein the list includes at least two columns having two or more rows, the columns and rows defining content fields having data elements therein, receive, from the administrator, a first selection of one or more of the columns to be made available to authorized subscribers but not displayed on a main page of a list application operating on each of the plurality of communication devices, receive, from the administrator, contact information for each of the authorized subscribers at the server;

associate each of the authorized subscribers with the dynamically-updated list, receive a request for access to the dynamically-updated list from one of the authorized subscribers, transmit the data elements in the columns to the list application operating on a communication device associated with the one of the authorized subscribers;

display, on the main page of the list application operating on the communication device, the data elements of the columns that are not in the first selection; and in response to selection of one of the rows in the main page, display data elements of the columns that are in the first selection, wherein the main page includes the graphic display of data elements generate by the list application after launch.

* * * * *